US006886819B2

(12) United States Patent
Kintz et al.

(10) Patent No.: US 6,886,819 B2
(45) Date of Patent: May 3, 2005

(54) MR FLUID FOR INCREASING THE OUTPUT OF A MAGNETORHEOLOGICAL FLUID DAMPER

(75) Inventors: K. Andrew Kintz, Apex, NC (US); Teresa L. Forehand, Raleigh, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/288,769

(22) Filed: Nov. 6, 2002

(65) Prior Publication Data

US 2004/0084263 A1 May 6, 2004

(51) Int. Cl.[7] .................................................... F16F 9/00
(52) U.S. Cl. ............................ 267/140.14; 267/140.15; 188/267.2
(58) Field of Search .............................. 188/267, 267.1, 188/267.2, 161, 164; 267/140.14, 140.15; 252/62.52, 62.54, 62.51 R

(56) References Cited

U.S. PATENT DOCUMENTS

| | | | | |
|---|---|---|---|---|
| 2,805,997 A | | 9/1957 | Benoit, Jr. et al. | |
| 4,164,473 A | | 8/1979 | Coupland et al. | |
| 4,889,647 A | | 12/1989 | Rowan et al. | |
| 5,277,281 A | | 1/1994 | Carlson et al. | |
| 5,284,330 A | | 2/1994 | Carlson et al. | |
| 5,317,647 A | | 5/1994 | Pagallo | |
| 5,390,121 A | | 2/1995 | Wolfe | |
| 5,398,917 A | | 3/1995 | Carlson et al. | |
| 5,412,130 A | | 5/1995 | Karol | |
| 5,492,312 A | | 2/1996 | Carlson | |
| 5,547,049 A | | 8/1996 | Weiss et al. | |
| 5,627,146 A | | 5/1997 | Tanaka et al. | |
| 5,634,969 A | | 6/1997 | Cody et al. | |
| 5,645,752 A | | 7/1997 | Weiss et al. | |
| 5,670,077 A | | 9/1997 | Carlson et al. | |
| 5,683,615 A | * | 11/1997 | Munoz | 252/62.52 |
| 5,711,746 A | | 1/1998 | Carlson | |
| 5,816,372 A | | 10/1998 | Carlson et al. | |
| 5,842,547 A | | 12/1998 | Carlson et al. | |
| 5,878,871 A | | 3/1999 | Miesner | |
| 5,900,184 A | * | 5/1999 | Weiss et al. | 252/62.52 |
| 5,906,767 A | * | 5/1999 | Karol et al. | 252/62.52 |
| 5,947,238 A | * | 9/1999 | Jolly et al. | 188/267.2 |
| 5,988,336 A | | 11/1999 | Wendt et al. | |
| 6,027,664 A | | 2/2000 | Weiss et al. | |
| 6,186,290 B1 | * | 2/2001 | Carlson | 188/164 |
| 6,254,661 B1 | | 7/2001 | Takeda et al. | |
| 6,373,465 B2 | | 4/2002 | Jolly et al. | |
| 6,394,239 B1 | * | 5/2002 | Carlson | 188/267.2 |
| 6,612,409 B2 | * | 9/2003 | Lun et al. | 188/267.2 |
| 6,637,557 B2 | * | 10/2003 | Oliver et al. | 188/267.2 |
| 6,637,560 B2 | * | 10/2003 | Oliver et al. | 188/322.19 |

FOREIGN PATENT DOCUMENTS

| | | |
|---|---|---|
| WO | WO 00/11407 | 3/2000 |

* cited by examiner

*Primary Examiner*—Matthew C. Graham
*Assistant Examiner*—Mariano Sy
(74) *Attorney, Agent, or Firm*—Miles B. Dearth

(57) ABSTRACT

Magnetorheological devices, including damping devices, rotary devices, and haptic systems constructed with said devices are disclosed. The devices contain dry magnetically-responsive particles, or MR fluids containing the magnetically responsive particles. The magnetically soft particles characterized by a single process yield population of atomized particles having a cumulative 10%, 50% and 90% by volume, fraction within specified size, i.e., $D_{10}$ of from 2 up to and including a $D_{10}$ of 5 $\mu$m, a $D_{50}$ 8 $\mu$m up to and including a $D_{50}$ of 15 $\mu$m, a $D_{90}$ of 25 $\mu$m up to and including a $D_{90}$ of 40 $\mu$m, and characterized by a least squares regression of log normal particles size against cumulative volume % fraction of greater than or equal to 0.77.

38 Claims, 6 Drawing Sheets

MR FLUID FOR INCREASING THE OUTPUT OF A MAGNETORHEOLOGICAL FLUID DAMPER

BACKGROUND OF THE INVENTION

Magnetorheological (MR) devices of the "rotary-acting" or "linear-acting" variety such as linear dampers, rotary brakes and rotary clutches employ magnetorheological materials as dry particles or particles dispersed in fluids occupying the working gap within the device. The particles are comprised of magneto-soft particles. The higher the applied magnetic field strength, the higher the damping or resistive force or torque needed to overcome the particle structure aligned within the field.

MR devices are disclosed in U.S. Pat. No. 5,816,372 entitled "Magnetorheological Fluid Devices And Process Of Controlling Force In Exercise Equipment Utilizing Same"; U.S. Pat. No. 5,711,746 entitled "Portable Controllable Fluid Rehabilitation Devices"; U.S. Pat. No. 5,842,547 entitled "Controllable Brake"; U.S. Pat. No. 5,878,871 entitled "Controllable Vibration Apparatus" and U.S. Pat. Nos. 5,547,049, 5,492,312, 5,398,917, 5,284,330, and 5,277,281, all of which are commonly assigned to the assignee of the present invention, and incorporated herein by reference.

The present invention is directed to dampers that include a housing or chamber that contains the magnetically controllable fluid disclosed hereinbelow, with a movable member, a piston or rotor, mounted for movement through the fluid in the housing. The housing and the movable member both include a magnetically permeable pole piece. A magnetic field generator produces a magnetic field across both pole pieces for directing the magnetic flux to desired regions of the controllable fluid. Such devices require precisely toleranced components, expensive seals, expensive bearings, and a relatively small volume of magnetically controllable fluid. MR devices as currently designed are comparatively expensive to manufacture. There is a continuing need for reducing the cost of controllable MR devices for providing variable forces and/or torques.

Conventional MR fluids containing magnetically active fine particles generally on the order of 1–100 $\mu$m average diameter employ conventional iron particles manufactured by the carbonyl process, whereby particles are grown by precipitation of pentacarbonyl salts. The cost of carbonyl powders are notoriously high. Magnetorheological fluids have been manufactured that employ magnetically active particles manufactured by an atomization method, which is a reductive process of dividing a molten metal stream into small particles. The molten metal stream is delivered into a high pressure, high velocity stream and divided by high shear and turbulence (hereinafter collectively referred to as "atomized particles").

Due to performance and cost concerns, suitable replacement for expensive carbonyl iron by atomized particles has not heretofore been a straightforward substitution. In conventional practice, atomized particles of a single process stream have been sieved to exclude a significant fraction of 10–20% of particles larger than 74 $\mu$m. In other examples, even larger fraction of 20–30+% of a single process yield of atomized particles greater than 45 $\mu$m size must be excluded. Removal of such unusable volume fractions representing yields of even 90% and below are now considered uneconomical.

Attempts have been made to blend atomized particles with carbonyl iron particles to achieve a suitable particle size distribution for use in MR dry powders and MR fluids. Heretofore, attempts to provide 100% of conventional atomized particles passing through a 74 $\mu$m sieve approaching toward a Gaussian distribution have been achieved by blending particles from more than one process stream. One example is a blend of carbonyl iron with atomized particles. U.S. Pat. No. 6,027,664 (Lord Corporation) teaches blends of a first population having an average particle diameter 3 to 15 times larger than the second population. The smaller average sized particles are carbonyl iron and larger size particles are atomized iron. Such mixtures suffer economically from yield losses carried over from classification or sieving, and costs associated with making blends per se.

The suitability of any particulate metals for use in MR fluids is in one respect determined by analyzing the deviation from a Gaussian distribution, and can be illustrated by a regression analysis. Mixtures of two different populations heretofore taught in the art have provided a degree of conformity to a Gaussian distribution that approaches the distribution of carbonyl iron-based particles. For example, a 50:50 wt. mixture of carbonyl iron and water-atomized particles available as of the filing date in the '664 patent exhibit a log normal size distribution, $R^2$, of 0.82. Although technically feasible, the particle blends heretofore available suffer from the same economic drawbacks. A need therefore exists for MR devices utilizing controllable powder or MR fluids utilizing particles of a lower cost single process stream to overcome the economic drawbacks. It would be advantageous to provide a MR fluid containing a particle component derived from a single process yield population of magnetically responsive particles exhibiting a suitable size population, and size distribution for improving economic factors in controllable devices.

SUMMARY OF THE INVENTION

In accordance with the invention, linear or rotary magnetically controllable devices such as dampers, clutches, brakes, and haptic interface systems employing such devices are disclosed. The devices are characterized as containing within the working gap or space, magnetically responsive particles (magnetically-soft particles) of a single atomization process stream population (i.e., non-mixtures) defined by particles having a 10% volume fraction ($D_{10}$)of 2 $\mu$m, 3 $\mu$m, 4 $\mu$m up to and including a $D_{10}$ of 5 $\mu$m; a 50% volume fraction ($D_{50}$ diameter) of 8 $\mu$m, 9 $\mu$m, 10 $\mu$m, 11 $\mu$m, 12 $\mu$m, 13 $\mu$m, 14 $\mu$m, up to and including a $D_{50}$ of 15 $\mu$m; a 90% volume fraction ($D_{90}$) of 25 $\mu$m up to and including a $D_{90}$ of 40 $\mu$m; and the single process population of atomized particles is further characterized by a least squares regression from log normal particle size against cumulative volume % ($R^2$) of greater than or equal to 0.77.

In one device embodiment directed to a magnetorheological damper device containing within its working gap, a MR fluid comprising a volume percent of carrier fluid, and a volume percent of particles from a single atomization process stream, and optionally an additive that reduces the interparticle friction, wherein the magnetic-responsive particles exhibit a $D_{10}$ of 2 $\mu$m up to and including a $D_{10}$ of 5 $\mu$m, a $D_{50}$ of 8 $\mu$m up to and including $D_{50}$ of 15 $\mu$m, and a $D_{90}$ of 25 $\mu$m up to and including a $D_{90}$ of 40 $\mu$m, the atomized particle population is also characterized by a least squares regression from log normal particle size against cumulative volume % ($R^2$) of greater than or equal to 0.77.

The invention is further directed to a magnetorheological rotary device containing the above described particles within the working gap. The invention is further directed to a haptic interface system operated by users to provide resistance forces against a haptic interface device. The system includes a controller for receiving a variable input signal and providing a variable output signal. The controller is adapted for running a program that processes a variable input signal and in response derives the variable output signal. The haptic interface device is in communication with at least one magnetically-controllable device disclosed herein.

DETAILED DESCRIPTION OF THE INVENTION

Figure 1:
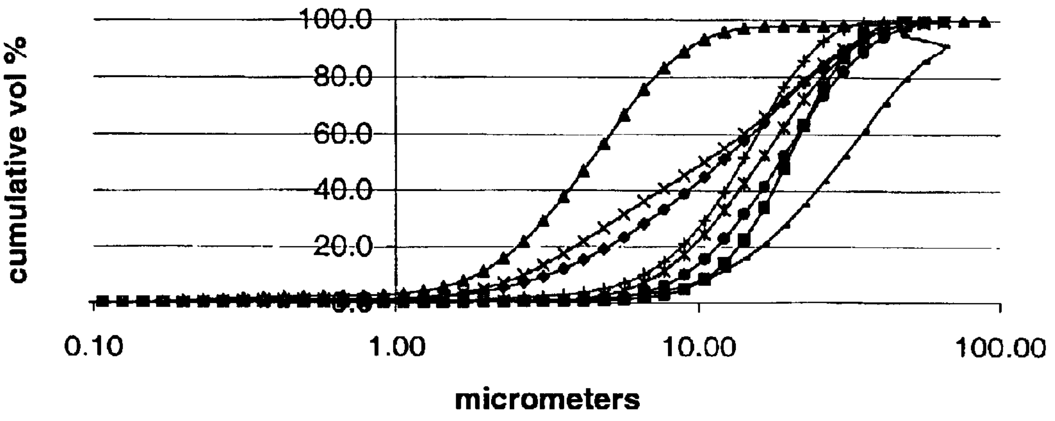
FIG. 1 is a log normal regression plot by Excel® of the curves of cumulative vol. % vs. particle size (μm) for iron particles taken from the data in TABLES 1–8 below as measured using a Malvern Instruments, Ltd, Mastersizer® S, Version 2.18.

The linear or rotary controllable devices include brakes, pistons, clutches, and dampers. Examples of dampers which include magnetorheological fluids are disclosed in U.S. Pat. Nos. 5,390,121 and 5,277,281 incorporated herein by reference.

A linear controllable damping apparatus for variably damping motion employs the magnetorheological fluid specified herein and comprises the following elements:

a) a housing for containing a volume of magnetorheological fluid;

b) a piston adapted for movement within the fluid-containing housing, where the piston is made of a ferrous metal, incorporating therein a number of windings of an electrically conductive wire defining a coil which produces magnetic flux in and around the piston, and c) valve means having a working gap associated with the housing and the piston for controlling movement of the magnetorheological fluid.

Example devices herein are fluid valves, composite structures and structural elements, shock absorbers, haptic devices, exercise equipment, electric switches, prosthetic devices including rapidly setting casts, elastomeric mounts, vibration mounts and other similar devices constructed to contain an excess of the amount of instant magnetorheological fluid required to occupy the working gap via a reservoir of magnetorheological fluid outside of the working gap from which particles can migrate into the working gap.

In the typical example practices of the present invention, a first portion of the magnetorheological fluid is positioned in working gap while a second portion of the magnetorheological fluid is positioned outside the working gap, but in fluid communication with the magnetorheological fluid in the working gap, i.e., in fluid containment compartment. Upon polarization of the particles in the magnetorheological fluid by application of an external field, particles from the second portion move into the working gap thus increasing the force output of the magnetorheological fluid device as a result of the increased particle concentration in the magnetorheological fluid in the working gap. During application of an external field, the particle volume concentration in the first portion of the magnetorheological fluid is greater than the static or off-state overall particle volume concentration. Static or off-state particle volume concentration means the average particle volume concentration exhibited by the combination of the magnetorheological fluid in the first portion and the controllable fluid in the second portion when a magnetic field is not being applied.

Controllable Dampers

A magnetorheological fluid controllable damper has essential components of a stationary housing, movable piston and field generator. The housing contains a predetermined volume of the MR fluid described herein. The damper has two principal modes of operation: sliding plate and flow (or valve) modes. Components of both modes will be present in every MR damper, with the force component of the flow or valve mode dominating.

The damper functions as a Coulomb or Bingham type damper, in which the force generated is controllable independently of piston velocity and large forces can be generated with low or zero velocity. This independence improves the controllability of the damper making the force a function of a precisely modulated magnetic field strength, which is a function of current flow in the circuit.

Figure 10:
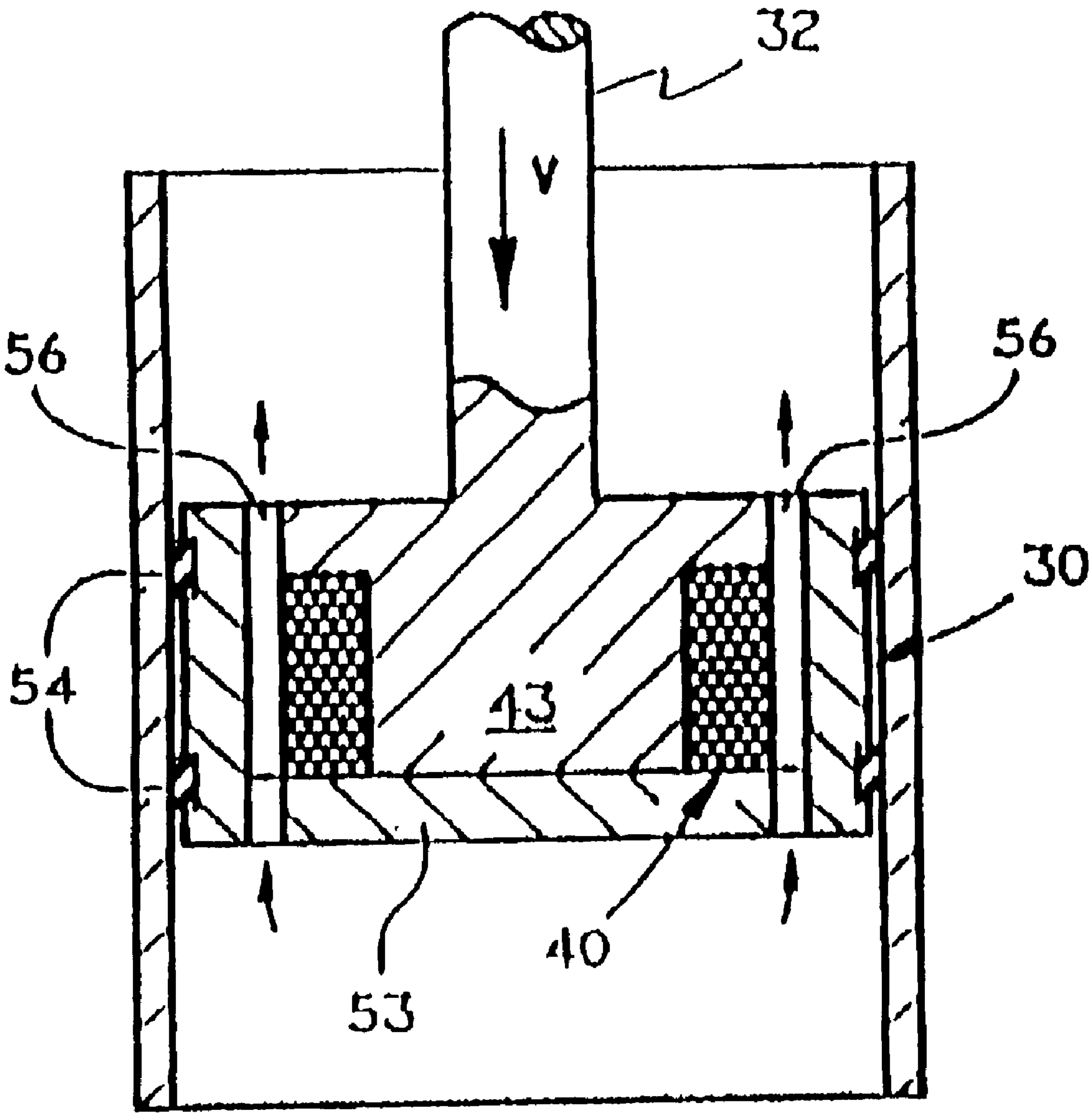
FIG. 10 is a cross sectional side view, a simple schematic of the piston portion of an MR damping device.

With reference to FIG. 10 there is depicted in crossectional side view, a simple schematic of the piston portion of an MR device, well known in the art and more fully illustrated in U.S. Pat. No. 5,277,281, issued Jan. 11, 1994. A piston is located within the housing (not shown). Piston head 30 on piston rod 32 is formed with a smaller maximum diameter than the inner diameter of the housing. In FIG. 10, the depicted piston embodiment contains coil 40 wound on core element 43 and residing in cup member 53. Not shown is the electrical connection to the coil through the piston rod by lead wires, one which is connected to a first end of an electrically conductive rod which extends through piston rod 32, a lead connected to a first end of coil windings and a ground lead from the other end of the coil winding. The upper end of piston rod 32 not shown has threads formed thereon to permit attachment to the damper. An external power supply, which provides a current in the range of 0–4 amps at a voltage of 12–24 volts, depending upon application, is connected to the leads.

Cup member 53 has a plurality of passageways 56 each having a predefined gap formed therein. In other typical embodiments, the gap is provided in an annulus. One or more seals such as at 54 extend about the periphery of cup member 53. Cup member 53 is attached to core element 43 by any fastening means, such as by threaded fasteners, not shown. A coil may alternatively be associated with the housing providing the possibility of a more stationary coil if desired. The device of the present invention utilizes a predefined annular flow gap ranging from 0.1 to 0.90 mm, and preferably 0.4 to 0.6 mm. The gap is desiredly small so as to provide compact MR fluid devices that generate a relatively high on-state force. Within the device gap of from 0.08 mm to 0.9 mm, more particularly within a working gap of 0.08 to 0.75 mm is an MR fluid comprising a carrier and magnetic-responsive particles obtained from a single atomization process stream disclosed above.

Controllable Clutch or Brake

The term "clutch" is employed when an accelerating torque is to be transmitted. If a decelerating torque is to be transmitted, the term "brake" is employed. The clutches according to the invention can also be used as a brake. A representative MR fluid clutch or brake includes a housing, preferably having first and second halves with substantially similar internal dimensions, preferably a disc-shaped rotor, a rotatable shaft, preferably manufactured from a magnetically soft material which has an optional key slot therein, a magnetically-soft yoke preferably having substantially identical first and second pole piece halves, grease or oil impregnated, porous, non-magnetic bushings, which radially support the shaft; elastomer seals, preferably of the elastomer quad-ring variety; disc-like springs for centering the rotor, a coil assembly for generating a changeable magnetic field which includes a polymeric bobbin, e.g., nylon, and multiple hoop wound wire coils, and electrical connectors and fasteners. Each pole piece half has a recess formed therein, which together interact to form the recess which receives the working portion of the rotor. Receiving rotor in the recess creates the first and second gaps adjacent to the working surface which contain a sufficient volume of the MR fluid specified herein. Clutches are of the barrel rotor type or multi-plate clutch are well known and described, for example In U.S. Pat. No. 5,988,336 incorporated herein by reference. The MR fluid contained in the recess is of the dry powder type or of the MR fluid type. The particles responsive to the magnetic field contained in the working gap are of a single process yield of atomized particles having a population exhibiting a $R^2$ of greater than or equal to 0.77 and also characterized by volume fraction $D_{10}$ of 2 $\mu$m up to and including a $D_{10}$ of 5 $\mu$m, a $D_{50}$ of 8 $\mu$m up to and including a $D_{50}$ of 15 $\mu$m, and a $D_{90}$ of 25 $\mu$m up to and including a $D_{90}$ of 40 $\mu$m.

An exemplary controllable brake in accordance with the invention, comprises:

(a) a shaft;

(b) a rotor manufactured from a highly magnetically permeable material having first and second rotor surfaces, a working portion, and an outer periphery whereby the rotor is interconnected to said shaft to restrain relative rotation therebetween;

(c) a housing including a magnetically-soft yoke which is manufactured from a highly magnetically permeable powdered metal material, said magnetically-soft yoke having a recess formed therein, said recess receiving said working portion of said rotor and forming a first gap adjacent to said first rotor surface and a second gap adjacent to said second rotor surface, said housing including a portion shaped relatively thin compared to a part of the housing including the yoke, said portion formed adjacent the shaft for preventing magnetic field buildup at a shaft sealing area;

(d) magnetically-soft particles as dry powder or dispersed in a carrier fluid, the particles being contained within and at least partially filling said first and second gaps, the particles are characterized as derived from a single process yield of atomized particles having a population exhibiting a $R^2$ of greater than or equal to 0.77 and also characterized by volume fraction $D_{10}$ of 2 $\mu$m up to and including a $D_{10}$ of 5 $\mu$m, a $D_{50}$ of 8 $\mu$m up to and including a $D_{50}$ of 15 $\mu$m, and a $D_{90}$ of 25 $\mu$m up to and including a $D_{90}$ of 40 $\mu$m; and (e) magnetic field generator that generates a changeable magnetic field, such as provided by a coil, and adjacent to said magnetically-soft yoke, said changeable magnetic field being directed to cause said magnetically-soft particles within said first and second gaps to change rheology thereby causing a change in torsional resistance of said controllable brake when said means for generating a changeable magnetic field is energized.

In more detail, the housing halves of a controllable brake are manufactured from, wrought steel, stamped steel, cast or machined aluminum, aluminum alloys, powdered metal, or the like. Most preferable housing materials are cast aluminum or a zinc/aluminum alloy. Each housing half preferably has a pole pocket formed therein and spaced radially outward from a shaft axis. The pockets are formed near its outermost radial portion for receiving ring-like pole piece halves of the magnetically-soft yoke therein. It is conventionally taught that spacing between the magnetically-soft yoke away from the shaft prevents or minimizes stray magnetic field buildup in the area adjacent to the shaft.

If aluminum or other nonmagnetic material is used in the housings, then spacing of the magnetically-soft yoke radially outward from the shaft acts as a means for limiting the magnetic field at or near the shaft seals. Likewise, if steel or other like magnetic material is used for the housing, the magnetic flux saturation zone having a thickness in combination with spacing the magnetically-soft yoke radially outward from the shaft limits the amount of stray magnetic field present in areas adjacent the shaft. The housing performs the functions of supporting the shaft and creating a portion of the MR fluid containment. The housing also includes projecting flange portions, preferably of which there are three or four pair, which are equally spaced and which are bolted together via fasteners, such as with socket-head cap screw and nut, to secure the assembly together. The housing also includes means to prevent rotation of the pole piece halves relative to each other and relative to the housing halves. One such preventive means is a nub and receiving groove for preventing rotation. Further, the fasteners could interact with localized cutouts or recesses formed in the radial outer periphery of pole pieces to restrain rotation thereof. Inducing a magnetic field between the poles causes structuring of the magnetic responsive particles which become polarized and align into chains acting across the first and second gaps. The metal particles have a density range of from about 6.4 $\mu m/cm^3$ to about 7.8 $\mu m/cm^3$. The rheology change responsive to the magnitude of the magnetic field causes an increase in torsional resistance between the housing and rotor at the working section thereof, with the resulting increased resistance to torsional rotation of the shaft relative to the housing. This provides the controllable resistance in the system which the MR brake is used, which for typical embodiments, can range up to about 220 in.—lb. of torque output.

Haptic Interface System

A controllable damper or controllable brake or both may also be incorporated as part of a haptic interface system in accordance with the invention. In accordance with another embodiment of the invention a haptic interface system is disclosed which comprises a haptic interface device movable by an operator in at least one direction of rotation or displacement, the haptic interface system provides resistance forces to the haptic interface device. The system includes a controller for receiving a variable input signal and providing a variable output signal. The controller is adapted for running a program that processes said variable input signal and in response derives the variable output signal. The haptic interface device is in communication with at least one magnetically-controllable device, such as a damper. There may be more than one similar or different controllable device in the haptic interface system. The at least one controllable damper or brake device has a plurality of positions, wherein an ease of movement of the haptic interface device among the plurality of positions is controlled by the variable resistance force of the controllable device that contains an MR fluid, in the case of a damper, and either a powdered magnetically soft material, or magnetically soft particles dispersed in a carrier fluid (MR fluid). The magnetically soft (magnetically-responsive) particles are derived from a single atomization process population having a $D_{10}$ of 2 $\mu$m up to and including a $D_{10}$ of 5 $\mu$m; a $D_{50}$ of 8 $\mu$m to a $D_{50}$ of 15 $\mu$m; and $D_{90}$ of 25 $\mu$m up to a $D_{90}$ of 40 $\mu$m; and wherein the single process population exhibits least squares regression from log normal distribution ($R^2$) of 0.77 and higher. The powder or MR fluid receives the variable output signal and provides a variable resistance force as a function of the variable output signal. The resistance function may be directly proportional, or a derivative of the variable output signal as provided by a computer data algorithm. The variable resistance forces are provided by changing the rheology of an MR powder or fluid in response to the output signal to directly control the ease of movement, simulate resulting forces and/or simulate a boundary limit of motion of the haptic interface device, among other types of forces. The variable resistance forces provide resistance against the displacement of the haptic interface device induced by the operator in at least one direction of displacement.

Examples of vehicles and machinery that can incorporate the haptic interface system of the present invention comprise industrial vehicles, watercraft, overhead cranes, trucks, automobiles, and robots. The haptic interface device may comprise, but shall not be limited to a steering wheel, crank, foot pedal, knob, mouse, joystick or lever.

Specifically, the haptic interface system in accordance with the invention includes one or more motors connected to the interface device in order to impart the force feedback sensation. Typical motors include direct current (DC) stepper motors and servo-motors. If the interface device is a joystick, motors are used to impart force in an x-direction, in a y-direction, or in combination to provide force in any direction that the joystick may be moved. Similarly, if the interface device is a steering wheel, motors are used to impart rotational force in clockwise and counterclockwise direction. Thus, motors are used to impart forces in any direction that the interface device may be moved.

In a system using a single motor, the motor may be connected to the interface device through a gear train, or other similar energy transfer device, in order to provide force in more than one direction. In order to enable one motor to be used in a system, a reversible motor is typically utilized to provide force in two different directions. Additionally, mechanisms are required to engage and disengage the various gears or energy transfer devices to provide force in the proper direction at the proper time. In contrast, other typical systems use more than one motor to provide force in the required directions. Thus, current systems utilize a number of differing approaches to handle the delivery of force feedback sensations.

Furthermore, the controller may send signals to the vehicle, machine or computer simulation in response to information obtained by a sensor and other inputs for purposes of controlling the operation of the vehicle, machine or computer simulation. Once the operator inputs and other inputs are processed by microprocessor, a force feedback signal is sent to the magnetically controllable device which in turn controls the haptic interface, such as a joystick, steering wheel, mouse or the like to reflect the control of the vehicle, machine or computer simulation.

The system additionally comprises a controller, such as a computer system, adapted to run an interactive program and a sensor that detects the position of the haptic interface device and provides a corresponding variable input signal to the controller. The controller processes the interactive program, and the variable input signal from the sensor, and provides a variable output signal corresponding to a semi-active, variable resistance force that provides the operator with tactile sensations as computed by the interactive program. The variable output signal energizes a magnetic field generating device, disposed adjacent to the first and second members, to produce a magnetic field having a strength proportional to the variable resistance force. The magnetic field is applied across the MR fluid disclosed herein which is disposed in the working gap or space between the first and second members. The applied magnetic field changes the resistance force of the MR fluid associated with relative movement, such as linear, rotational or curvilinear motion, between the first and second members in communication with the haptic interface device. The variable output signal from the controller controls the strength of the applied magnetic field, and hence the variable resistance force of the MR fluid. The resistance force provided by energizing the MR fluid controls the ease of movement of the haptic interface device among a plurality of positions. Thus, the haptic interface system provides an operator of a vehicle, machine, or computer simulation, force feedback sensations through the magnetically-controllable device that opposes the movement of the haptic interface device.

The haptic interface device is in operative contact with the operator of a vehicle, machine or computer system. The magnetically-controllable device beneficially comprises the MR fluid between a first and second member, where the second member is in communication with the haptic interface device. The haptic interface system of the present invention may be used to control vehicle steering, throttling, clutching and braking; computer simulations; machinery motion and functionality. Examples of vehicles and machinery that might include the haptic interface system of the present invention comprise industrial vehicles and watercraft, overhead cranes, trucks, automobiles, and robots.

The haptic interface device may comprise, but shall not be limited to a steering wheel, crank, foot pedal, knob, mouse, joystick and lever.

In a preferred controllable device, the MR fluid herein described is distributed about an absorbent element which is disposed between the first and second member. The preferred absorbent element is a reticulated, porous polymeric matrix and is resilient. The resilient element is preferably positioned in the device in a partially compressed state from a resting state, preferably in the amount of about 30%–70% compression from the resting state. The absorbent element may be formed as a matrix structure having open spaces for retaining the MR fluid. Suitable materials for the absorbent element comprise open-celled foam, such as from a polyurethane material, among others. A preferred haptic interface system is disclosed in U.S. Pat. No. 6,373,465, incorporated herein by reference.

Particle Component

Magnetically responsive particles or MR fluid comprising a carrier and responsive particles are obtained from a single atomization process stream that possess unique particle distribution by the fact that the particles are unclassified except for removal of a minute fraction representing less than 5%, more typically less than 2% by volume, and more preferably less than 1% by volume of waste including outsized, a single coarse screening such as through a 200 mesh, 170 mesh or 140 mesh sieve (74, 88, and 105 micrometers, respectively). The term "unclassified" used herein is interpreted to mean no further classification except for a single coarse screening step. The particle population of the single process stream is distinguished on the basis of cumulative volume fractions less than or equal to specified micrometer (micron) size. Instrumented analysis methods known in the art are capable of reporting cumulative volume percent less than or equal to a specified particle size at 10%, 50% and 90%, and are referred to in the art as $D_{10}$, $D_{50}$, and $D_{90}$, respectively. The magnetically responsive particles operating within the working gap are characterized by a $D_{10}$ of 2 $\mu$m up to and including a $D_{10}$ of 5 $\mu$m; a $D_{50}$ of 8 $\mu$m to a $D_{50}$ of 15 $\mu$m; and $D_{90}$ of 25 $\mu$m up to a $D_{90}$ of 40 $\mu$m. The particle population from a single atomization process stream is further distinguished by a least squares regression of log normal particle size in microns against the cumulative volume % fraction ($R^2$) of 0.77 and higher.

The determination of $D_{10}$, $D_{50}$,and $D_{90}$ is accurately determined using instruments available in the art. A Malvern Instruments, Ltd. (Malvern, U.K) model Mastersizer® S, version 2.18 is suitably equipped by the manufacturer to analyze the particle volume distribution and analyze the cumulative vol. % fraction $\mu$m sizes at $D_{10}$, $D_{50}$, and $D_{90}$ The particle fraction data is inputted to conventional regression analysis techniques imbedded in typical statistical software such as Excel® for determination of $R^2$.

Reference is made to FIG. 1, which includes the log normal plots of the data taken from each of the examples below to graphically illustrate the conformity of carbonyl iron (C-1) compared to atomized particle populations and mixtures of atomized particles and carbonyl iron (Control 7). For each example analyzed for volume % distribution, the cumulative volume fraction data in relation to log normal particle size ($\mu$m) was inputted to regression analysis software from Microsoft® Excel, and a least squares regression function calculated. The $R^2$ values obtained for the examples characterizes the degree of conformity to a log normal distribution.

Figure 2:
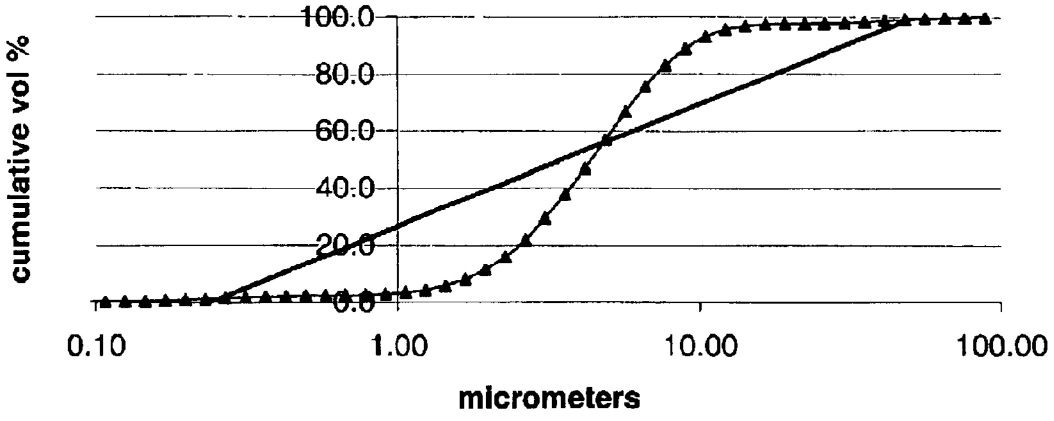
FIG. 2 is a log normal regression plot by Excel® of cumulative vol. % vs. particle size (μm) for prior art carbonyl iron particles taken from the data in TABLE 1 below as measured using a Malvern Instruments, Ltd, Mastersizer® S, Version 2.18.

With reference to FIG. 2, the graph represents a log normal plot of the particle size distribution from the data in TABLE 1 using a Malvern Mastercizer® S for Control 1-carbonyl iron particles, R-2430, ex. ISP Corp.

TABLE 1

Control 1

ID" Control 1: carbonyl Iron (grade 2430)

| | | |
|---|---|---|
| Range: 300 RF mm | Beam: 2.40 mm Sampler: MS1 | Obs[1]: 28.5% |
| Presentation: 3_IP & PAO | Analysis: Polydisperse | Residual: 0.393% |
| Modifications: None | | |
| Conc. = 0.0106% Vol | Density = 1.000 g/cm^3 | S.S.A. = 2.3413 m^2/g |
| Distribution: Volume | D[4, 3] = 5.83 um | D[3, 2] = 2.56 um |
| D(v, 0.1) = 1.95 um | D(v, 0.5) = 4.66 um | D(v, 0.9) = 10.3 um |
| Span = 1.694E+00 | Uniformity = 7.016E−01 | |

| Size (um) | Cum. Vol. % | Size (um) | Cum. Vol. % | Size (um) | Cum. Vol. % | Size (um) | Cum. Vol. % |
|---|---|---|---|---|---|---|---|
| 0.06 | 0.0 | 0.36 | 1.9 | 2.28 | 16.0 | 16.57 | 97.5 |
| 0.07 | 0.1 | 0.42 | 2.2 | 2.65 | 21.9 | 19.31 | 97.7 |
| 0.08 | 0.1 | 0.49 | 2.4 | 3.09 | 29.2 | 22.49 | 97.7 |
| 0.09 | 0.2 | 0.58 | 2.5 | 3.60 | 37.7 | 26.20 | 97.8 |
| 0.11 | 0.2 | 0.67 | 2.6 | 4.19 | 46.9 | 30.53 | 98.0 |
| 0.13 | 0.3 | 0.78 | 2.7 | 4.88 | 56.7 | 35.56 | 98.3 |
| 0.15 | 0.5 | 0.91 | 2.9 | 5.69 | 66.6 | 41.43 | 98.7 |
| 0.17 | 0.6 | 1.06 | 3.4 | 6.63 | 75.6 | 48.27 | 99.1 |
| 0.20 | 0.9 | 1.24 | 4.3 | 7.72 | 83.2 | 56.23 | 99.4 |
| 0.23 | 1.1 | 1.44 | 5.8 | 9.00 | 89.0 | 65.51 | 99.7 |
| 0.27 | 1.4 | 1.68 | 8.1 | 10.48 | 93.0 | 76.32 | 99.9 |
| 0.31 | 1.7 | 1.95 | 11.4 | 12.21 | 95.6 | 88.91 | 100.0 |
| | | | | 14.22 | 96.9 | 103.58 | 100.0 |

Figure 3:
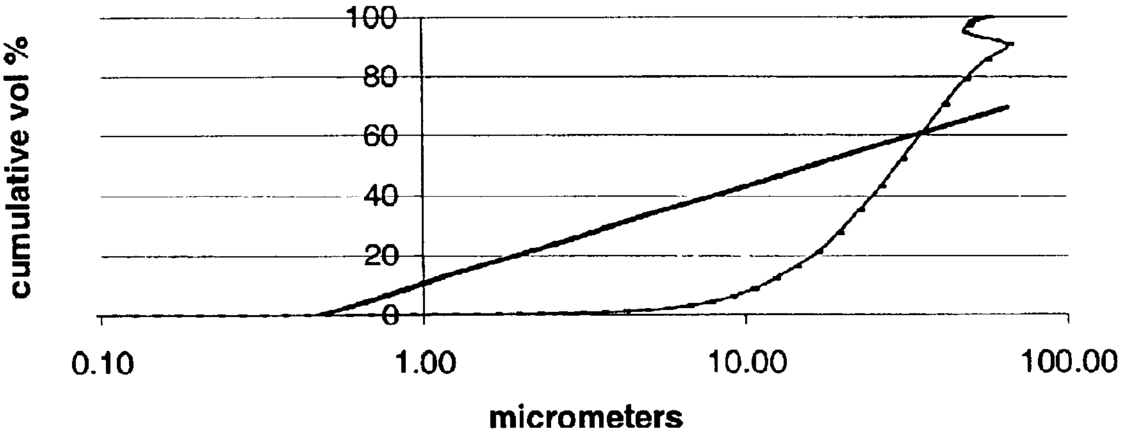
FIG. 3 is a log normal regression plot by Excel® of cumulative vol. % vs. particle size (μm) for conventional atomized particles taken from the data in TABLE 2 below, as measured using a Malvern Instruments, Ltd, Mastersizer® S, Version 2.18.

With reference to FIG. 3, the graph represents a log normal plot of the particle size distribution from the data in TABLE 2 using a Malvern Mastercizer® S for atomized particles FPI (−325 mesh) ex. Hoeganes.

TABLE 2

Control 2

ID: Control 2 Atomet ® Grade FPI (−325 mesh)

| | | |
|---|---|---|
| Range: 300 RF mm | Beam: 2.40 mm Sampler: MS1 | Obs[1]: 30.40% |
| Presentation: 3_IP & PAO | Analysis: Polydisperse | Residual: 0.361% |
| Modifications: None | | |
| Conc. = 0.0934% Vol | Density = 1.000 g/cm^3 | S.S.A. = 0.3028 m^2/g |
| Distribution: Volume | D[4, 3] = 35.27 um | D[3, 2] = 19.82 um |
| D(v, 0.1) = 11.26 um | D(v, 0.5) = 29.60 um | D(v, 0.9) = 63.64 um |
| Span = 1.770E+00 | Uniformity = 5.583E−01 | |

| Size (um) | Cum. Vol. % | Size (um) | Cum. Vol. % | Size (um) | Cum. Vol. % | Size (um) | Cum. Vol. % |
|---|---|---|---|---|---|---|---|
| 0.06 | 0.0 | 0.36 | 0.0 | 2.28 | 0.6 | 16.57 | 21.1 |
| 0.07 | 0.0 | 0.42 | 0.0 | 2.65 | 0.7 | 19.31 | 27.3 |
| 0.08 | 0.0 | 0.49 | 0.0 | 3.09 | 0.9 | 22.49 | 34.7 |
| 0.09 | 0.0 | 0.58 | 0.0 | 3.60 | 1.1 | 26.20 | 43.0 |
| 0.11 | 0.0 | 0.67 | 0.1 | 4.19 | 1.4 | 30.53 | 51.9 |
| 0.13 | 0.0 | 0.78 | 0.1 | 4.88 | 1.8 | 35.56 | 61.1 |
| 0.15 | 0.0 | 0.91 | 0.2 | 5.69 | 2.4 | 41.43 | 70.5 |
| 0.17 | 0.0 | 1.06 | 0.2 | 6.63 | 3.3 | 48.27 | 78.8 |
| 0.20 | 0.0 | 1.24 | 0.3 | 7.72 | 4.6 | 56.23 | 85.7 |
| 0.23 | 0.0 | 1.44 | 0.3 | 9.00 | 6.3 | 65.51 | 90.9 |
| 0.27 | 0.0 | 1.68 | 0.4 | 10.48 | 8.6 | 76.32 | 94.5 |
| 0.31 | 0.0 | 1.95 | 0.5 | 12.21 | 11.8 | 88.91 | 96.8 |
| | | | | 14.22 | 15.9 | 103.58 | 98.1 |
| | | | | | | 120.67 | 98.8 |
| | | | | | | 140.58 | 99.1 |
| | | | | | | 163.77 | 99.4 |
| | | | | | | 190.80 | 99.6 |
| | | | | | | 222.28 | 99.8 |
| | | | | | | 258.95 | 99.9 |
| | | | | | | 301.68 | 100.0 |

Figure 4:
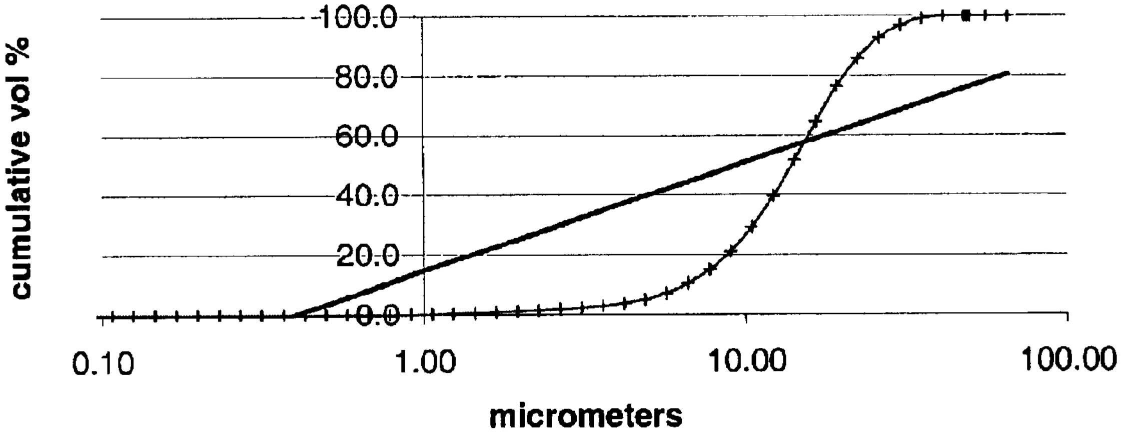
FIG. 4 is a log normal regression plot by Excel® of cumulative vol. % vs. particle size (μm) for conventional atomized iron particles taken from the data in TABLE 3 below as measured using a Malvern Instruments, Ltd, Mastersizer® S, Version 2.18.

With reference to FIG. 4, the graph represents a log normal plot of the particle size distribution from the data in TABLE 3 using a Malvern Mastercizer® S for atomized particles of Control 3, FPI Grade II (2), ex. Hoeganes.

TABLE 3

Control 3

ID" Control 3: FPI - Grade 2

| | | |
|---|---|---|
| Range: 300 RF mm | Beam: 2.40 mm Sampler: MS1 | Obs[1]: 24.7% |
| Presentation: 3_IP & PAO | Analysis: Polydisperse | Residual: 0.491% |
| Modifications: None | | |
| Conc. = 0.0449% Vol | Density = 1.000 g/cm^3 | S.S.A. = 2.3413 m^2/g |
| Distribution: Volume | D[4, 3] = 17.31 um | D[3, 2] = 12.20 um |
| D(v, 0.1) = 7.58 um | D(v, 0.5) = 16.27 um | D(v, 0.9) = 28.61 um |
| Span = 1.292E+00 | Uniformity = 4.023E−01 | |

| Size (um) | Cum. Vol. % | Size (um) | Cum. Vol. % | Size (um) | Cum. Vol. % | Size (um) | Cum. Vol. % |
|---|---|---|---|---|---|---|---|
| 0.06 | 0.0 | 0.36 | 0.0 | 2.28 | 1.2 | 16.57 | 51.5 |
| 0.07 | 0.0 | 0.42 | 0.0 | 2.65 | 1.6 | 19.31 | 64.5 |
| 0.08 | 0.0 | 0.49 | 0.0 | 3.09 | 2.0 | 22.49 | 76.3 |
| 0.09 | 0.0 | 0.58 | 0.0 | 3.60 | 2.4 | 26.20 | 85.8 |
| 0.11 | 0.0 | 0.67 | 0.0 | 4.19 | 3.0 | 30.53 | 92.5 |
| 0.13 | 0.0 | 0.78 | 0.0 | 4.88 | 3.9 | 35.56 | 96.8 |
| 0.15 | 0.0 | 0.91 | 0.0 | 5.69 | 5.3 | 41.43 | 99.1 |
| 0.17 | 0.0 | 1.06 | 0.1 | 6.63 | 7.3 | 48.27 | 100.0 |
| 0.20 | 0.0 | 1.24 | 0.2 | 7.72 | 10.4 | 56.23 | 100.0 |
| 0.23 | 0.0 | 1.44 | 0.4 | 9.00 | 14.9 | 65.51 | 100.0 |
| 0.27 | 0.0 | 1.68 | 0.6 | 10.48 | 21.1 | 76.32 | 100.0 |
| 0.31 | 0.0 | 1.95 | 0.9 | 12.21 | 29.3 | 88.91 | 100.0 |
| | | | | 14.22 | 39.6 | 103.58 | 100.0 |
| | | | | | | 120.67 | 100.0 |

Figure 5:
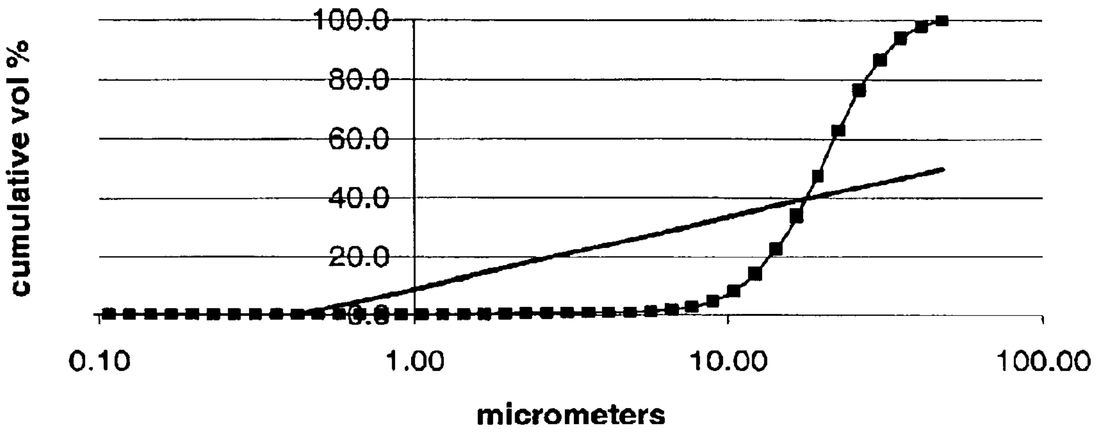
FIG. 5 is a log normal regression plot by Excel® of cumulative vol. % vs. particle size (μm) for conventional atomized particles taken from the data in TABLE 4 below as measured using a Malvern Instruments, Ltd, Mastersizer® S, Version 2.18.

With reference to FIG. 5, the graph represents a log normal plot of the particle size distribution from the data in TABLE 4 using a Malvern Mastercizer® S for atomized particles of Control 4, FPI Grade II GAF, ex. Hoeganes.

TABLE 4

Control 4

ID" Control 3: Hoeganes ® Grade II GAF

| | | |
|---|---|---|
| Range: 300 RF mm | Beam: 2.40 mm Sampler: MS1 | Obs[1]: 24.7% |
| Presentation: 3_IP & PAO | Analysis: Polydisperse | Residual: 0.491% |
| Modifications: None | | |
| Conc. = 0.0449% Vol | Density = 1.000 g/cm^3 | S.S.A. = 2.3413 m^2/g |
| Distribution: Volume | D[4, 3] = 17.31 um | D[3, 2] = 12.20 um |
| D(v, 0.1) = 10.2 um | D(v, 0.5) = 19.0 um | D(v, 0.9) = 32.5 um |
| Span = 1.292E+00 | Uniformity = 4.023E−01 | |

| Size (um) | Cum. Vol. % | Size (um) | Cum. Vol. % | Size (um) | Cum. Vol. % | Size (um) | Cum. Vol. % |
|---|---|---|---|---|---|---|---|
| 0.06 | 0.0 | 0.36 | 0.0 | 2.28 | 0.5 | 16.57 | 34.1 |
| 0.07 | 0.0 | 0.42 | 0.0 | 2.65 | 0.6 | 19.31 | 47.9 |
| 0.08 | 0.0 | 0.49 | 0.0 | 3.09 | 0.7 | 22.49 | 63.1 |
| 0.09 | 0.0 | 0.58 | 0.0 | 3.60 | 0.8 | 26.20 | 76.5 |
| 0.11 | 0.0 | 0.67 | 0.0 | 4.19 | 0.9 | 30.53 | 86.9 |
| 0.13 | 0.0 | 0.78 | 0.0 | 4.88 | 1.0 | 35.56 | 93.9 |
| 0.15 | 0.0 | 0.91 | 0.0 | 5.69 | 1.3 | 41.43 | 98.0 |
| 0.17 | 0.0 | 1.06 | 0.0 | 6.63 | 1.9 | 48.27 | 100.0 |
| 0.20 | 0.0 | 1.24 | 0.1 | 7.72 | 3.1 | 56.23 | 100.0 |
| 0.23 | 0.0 | 1.44 | 0.2 | 9.00 | 5.2 | 65.51 | 100.0 |
| 0.27 | 0.0 | 1.68 | 0.2 | 10.48 | 8.7 | 76.32 | 100.0 |
| 0.31 | 0.0 | 1.95 | 0.4 | 12.21 | 14.4 | 88.91 | 100.0 |
| | | | | 14.22 | 22.8 | 103.58 | 100.0 |
| | | | | | | 120.67 | 100.0 |

Figure 6:
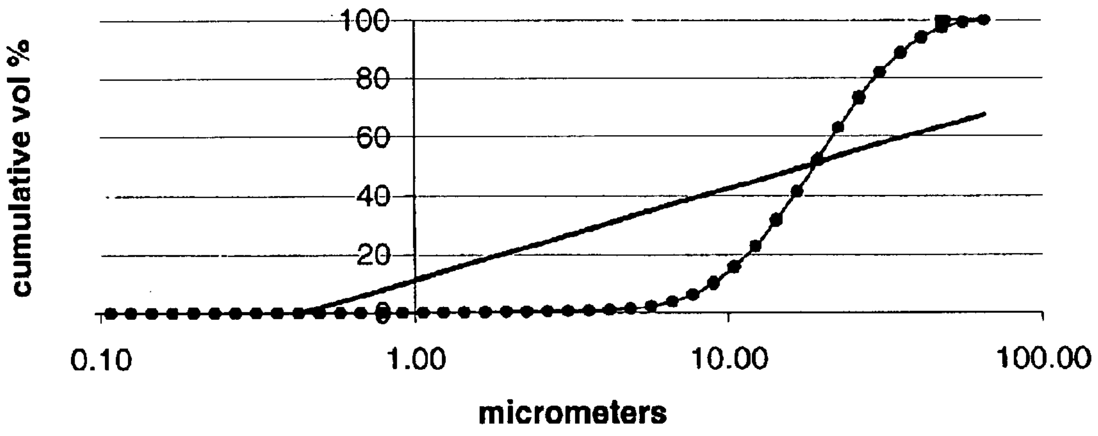
FIG. 6 a log normal regression plot by Excel® of cumulative vol. % vs. particle size (μm) for conventional atomized particles taken from the data in TABLE 5 below as measured using a Malvern Instruments, Ltd, Mastersizer® S, Version 2.18.

With reference to FIG. 6, the graph represents a log normal plot of the particle size distribution from the data in TABLE 5 using a Malvern Mastercizer® S for atomized particles of Control 5, Atomet® PD 3871, ex. Quebec Metal Powders.

TABLE 5

Control 5

ID" Control 5: Atomet ® PD 3871

| | | |
|---|---|---|
| Range: 300 RF mm | Beam: 2.40 mm Sampler: MS1 | Obs[1]: 18.8% |
| Presentation: 3_IP & PAO | Analysis: Polydisperse | Residual: 0.338% |
| Modifications: None | | |
| Conc. = 0.0406% Vol | Density = 1.000 g/cm^3 | S.S.A. = 0.4022 m^2/g |
| Distribution: Volume | D[4, 3] = 20.96 um | D[3, 2] = 14.92 um |
| D(v, 0.1) = 8.87 um | D(v, 0.5) = 18.73 um | D(v, 0.9) = 36.46 um |
| Span = 1.473E+00 | Uniformity = 4.585E−01 | |

| Size (um) | Cum. Vol. % | Size (um) | Cum. Vol. % | Size (um) | Cum. Vol. % | Size (um) | Cum. Vol. % |
|---|---|---|---|---|---|---|---|
| 0.06 | 0.0 | 0.36 | 0.0 | 2.28 | 0.5 | 16.57 | 41.5 |
| 0.07 | 0.0 | 0.42 | 0.0 | 2.65 | 0.6 | 19.31 | 52.1 |
| 0.08 | 0.0 | 0.49 | 0.0 | 3.09 | 0.7 | 22.49 | 63.2 |
| 0.09 | 0.0 | 0.58 | 0.0 | 3.60 | 0.8 | 26.20 | 73.4 |
| 0.11 | 0.0 | 0.67 | 0.0 | 4.19 | 1.1 | 30.53 | 82.1 |
| 0.13 | 0.0 | 0.78 | 0.0 | 4.88 | 1.5 | 35.56 | 89.0 |
| 0.15 | 0.0 | 0.91 | 0.0 | 5.69 | 2.4 | 41.43 | 94.0 |
| 0.17 | 0.0 | 1.06 | 0.1 | 6.63 | 4.0 | 48.27 | 97.3 |
| 0.20 | 0.0 | 1.24 | 0.2 | 7.72 | 6.5 | 56.23 | 99.1 |
| 0.23 | 0.0 | 1.44 | 0.2 | 9.00 | 10.4 | 65.51 | 100.0 |
| 0.27 | 0.0 | 1.68 | 0.3 | 10.48 | 15.9 | 76.32 | 100.0 |
| 0.31 | 0.0 | 1.95 | 0.4 | 12.21 | 23.0 | 88.91 | 100.0 |
| | | | | 14.22 | 31.7 | 103.58 | 100.0 |
| | | | | | | 120.67 | 100.0 |

Figure 7:
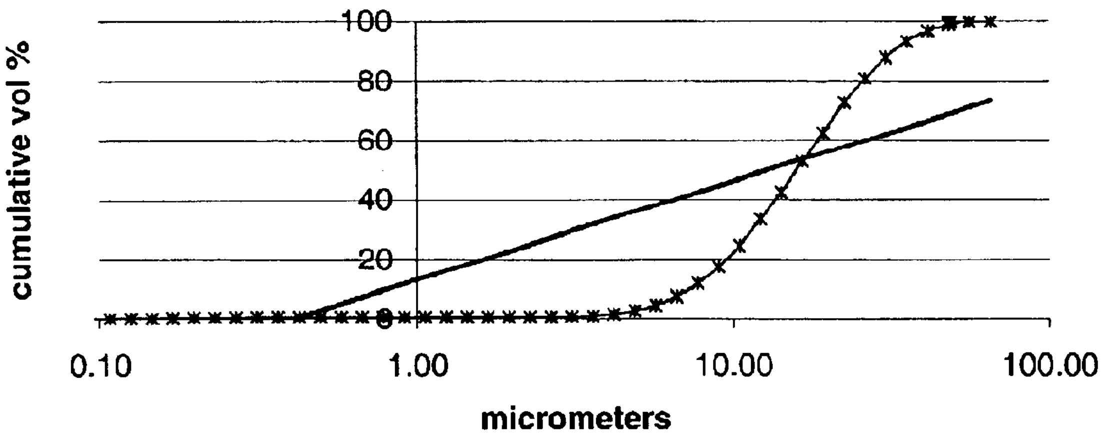
FIG. 7 is a log normal regression plot by Excel® of cumulative vol. % vs. particle size (μm) for conventional atomized particles taken from the data in TABLE 6 below as measured using a Malvern Instruments, Ltd, Mastersizer® S, Version 2.18.

With reference to FIG. 7, the graph represents a log normal plot of the particle size distribution from the data in TABLE 6 using a Malvern Mastercizer® S for atomized particles of Control 6, Atomet® PD 4155, ex. Quebec Metal Powders.

TABLE 6

Control 6

ID" Control 6: Atomet ® PD 4155

| | | |
|---|---|---|
| Range: 300 RF mm | Beam: 2.40 mm Sampler: MS1 | Obs[1]: 24.6% |
| Presentation: 3_IP & PAO | Analysis: Polydisperse | Residual: 0.421% |
| Modifications: None | | |
| Conc. = 0.0350% Vol | Density = 1.000 g/cm^3 | S.S.A. = 0.4022 m^2/g |
| Distribution: Volume | D[4, 3] = 21.10 um | D[3, 2] = 8.72 um |
| D(v, 0.1) = 8.46 um | D(v, 0.5) = 18.55 um | D(v, 0.9) = 37.78 um |
| Span = 1.581E+00 | Uniformity = 4.907E−01 | |

| Size (um) | Cum. Vol. % | Size (um) | Cum. Vol. % | Size (um) | Cum. Vol. % | Size (um) | Cum. Vol. % |
|---|---|---|---|---|---|---|---|
| 0.06 | 0.02 | 0.36 | 0.7 | 2.28 | 0.5 | 16.57 | 52.5 |
| 0.07 | 0.1 | 0.42 | 0.7 | 2.65 | 0.7 | 19.31 | 62.4 |
| 0.08 | 0.1 | 0.49 | 0.7 | 3.09 | 0.8 | 22.49 | 72.2 |
| 0.09 | 0.1 | 0.58 | 0.7 | 3.60 | 1.1 | 26.20 | 80.6 |
| 0.11 | 0.2 | 0.67 | 0.7 | 4.19 | 1.7 | 30.53 | 87.6 |
| 0.13 | 0.2 | 0.78 | 0.7 | 4.88 | 2.8 | 35.56 | 92.9 |
| 0.15 | 0.3 | 0.91 | 0.7 | 5.69 | 4.7 | 41.43 | 96.5 |
| 0.17 | 0.4 | 1.06 | 0.7 | 6.63 | 7.5 | 48.27 | 98.8 |
| 0.20 | 0.5 | 1.24 | 0.7 | 7.72 | 11.7 | 56.23 | 99.9 |
| 0.23 | 0.6 | 1.44 | 0.7 | 9.00 | 17.4 | 65.51 | 99.9 |
| 0.27 | 0.6 | 1.68 | 0.7 | 10.48 | 24.6 | 76.32 | 99.9 |
| 0.31 | 0.7 | 1.95 | 0.7 | 12.21 | 33.1 | 88.91 | 99.9 |
| | | | | 14.22 | 42.5 | 103.58 | 99.9 |
| | | | | | | 120.67 | 99.9 |

Figure 8:
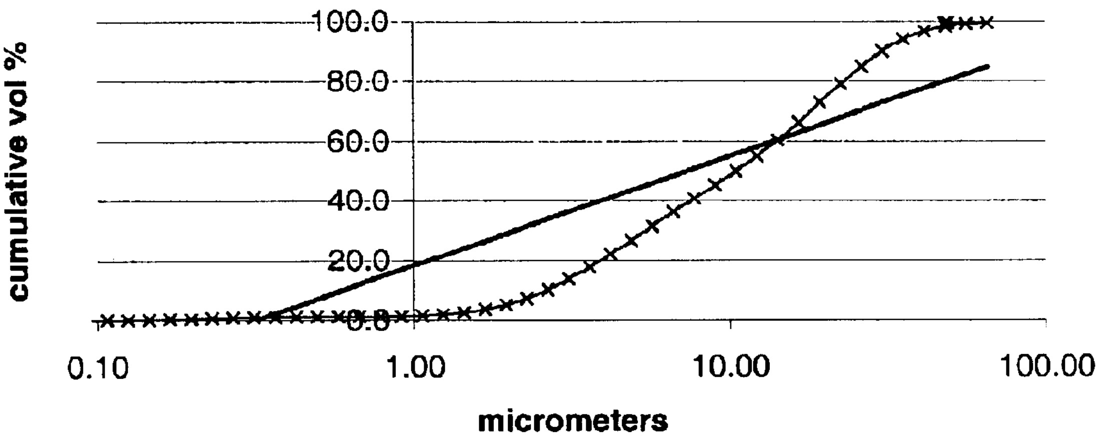
FIG. 8 is a log normal regression plot by Excel® of cumulative vol. % vs. particle size (μm) for conventional atomized particles taken from the data in TABLE 7 below as measured using a Malvern Instruments, Ltd, Mastersizer® S, Version 2.18.

With reference to FIG. 8, the graph represents a log normal plot of the particle size distribution from the data in TABLE 7 using a Malvern Mastercizer® S for Control 7, a 50:50 wt. % mix of carbonyl iron 2430 and FPI Grade II.

TABLE 7

Control 7

ID" Control 7: (50:50 mix Ctrl 1: Ctrl 4) (carbonyl Iron/FPI Grade 2)

| | | |
|---|---|---|
| Range: 300 RF mm | Beam: 2.40 mm | Obs[1]: 26.8% |
| Presentation: 3_IP & PAO | Analysis: Polydisperse | Residual: 0.463% |
| Modifications: None | | |
| Conc. = 0.0174% Vol | Density = 1.000 g/cm^3 | S.S.A. = 1.3630 m^2/g |
| Distribution: Volume | D[4, 3] = 14.88 um | D[3, 2] = 4.40 um |
| D(v, 0.1) = 2.63 um | D(v, 0.5) = 10.49 um | D(v, 0.9) = 30.77 |
| Span = 2.683E+00 | Uniformity = 9.433E−01 | |

| Size (um) | Cum. Vol. % | Size (um) | Cum. Vol. % | Size (um) | Cum. Vol. % | Size (um) | Cum. Vol. % |
|---|---|---|---|---|---|---|---|
| 0.06 | 0.0 | 0.36 | 1.1 | 2.28 | 7.4 | 16.57 | 66.2 |
| 0.07 | 0.0 | 0.42 | 1.2 | 2.65 | 10.2 | 19.31 | 72.5 |
| 0.08 | 0.1 | 0.49 | 1.3 | 3.09 | 13.6 | 22.49 | 78.9 |
| 0.09 | 0.1 | 0.58 | 1.3 | 3.60 | 17.7 | 26.20 | 84.8 |
| 0.11 | 0.2 | 0.67 | 1.3 | 4.19 | 22.1 | 30.53 | 89.8 |
| 0.13 | 0.2 | 0.78 | 1.3 | 4.88 | 26.8 | 35.56 | 93.7 |
| 0.15 | 0.3 | 0.91 | 1.4 | 5.69 | 31.5 | 41.43 | 96.4 |
| 0.17 | 0.4 | 1.06 | 1.7 | 6.63 | 36.1 | 48.27 | 98.1 |
| 0.20 | 0.6 | 1.24 | 2.0 | 7.72 | 40.7 | 56.23 | 98.9 |
| 0.23 | 0.7 | 1.44 | 2.7 | 9.00 | 45.3 | 65.51 | 99.3 |
| 0.27 | 0.9 | 1.68 | 3.7 | 10.48 | 50.0 | 76.32 | 99.3 |
| 0.31 | 1.0 | 1.95 | 5.2 | 12.21 | 54.9 | 88.91 | 99.3 |
| | | | | 14.22 | 60.3 | 103.58 | 99.3 |
| | | | | | | 120.67 | 99.3 |

Figure 9:
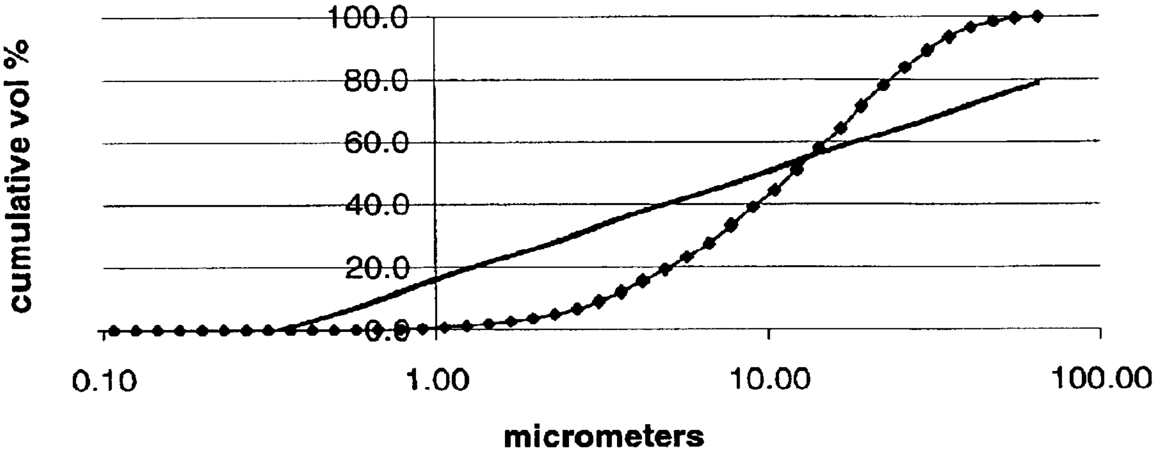
FIG. 9 is a log normal regression plot by Excel® of cumulative vol. % vs. particle size (μm) for atomized particles of Example 1 taken from the data in TABLE 8 below as measured using a Malvern Instruments, Ltd, Mastersizer® S, Version 2.18.

With reference to FIG. 9, the graph represents a log normal plot the cumulate vol. % of particles from data in TABLE 8 for atomized particles used in accordance with the invention.

TABLE 8

Example 1 according to the Invention

ID: Example 1 (Atmix PF20E)

| | | |
|---|---|---|
| Range: 300 RF mm | Beam: 2.40 mm Sampler: MS1 | Obs[1]: 24.4% |
| Presentation: 3_IP & PAO | Analysis: Polydisperse | Residual: 0.644% |
| Modifications: None | | |
| Conc. = 0.0237% Vol | Density = 1.000 g/cm^3 | S.S.A. = 0.8738 m^2/g |
| Distribution: Volume | D[4, 3] = 14.96 um | D[3, 2] = 6.78 um |
| D(v, 0.1) = 3.14 um | D(v, 0.5) = 11.89 um | D(v, 0.9) = 31.34 um |
| Span = 2.371E+00 | Uniformity = 7.412E−01 | |

| Size (um) | Cum. Vol. In % | Size (um) | Cum. Vol. In % | Size (um) | Cum. Vol. In % | Size (um) | Cum. Vol. In % |
|---|---|---|---|---|---|---|---|
| 0.06 | 0.00 | 0.36 | 0.00 | 2.28 | 5.7 | 16.57 | 64.4 |
| 0.07 | 0.00 | 0.42 | 0.00 | 2.65 | 7.5 | 19.31 | 71.3 |
| 0.08 | 0.00 | 0.49 | 0.00 | 3.09 | 9.7 | 22.49 | 77.9 |
| 0.09 | 0.00 | 0.58 | 0.1 | 3.60 | 12.4 | 26.20 | 84.0 |
| 0.11 | 0.00 | 0.67 | 0.2 | 4.19 | 15.6 | 30.53 | 89.2 |
| 0.13 | 0.00 | 0.78 | 0.4 | 4.88 | 19.2 | 35.56 | 93.4 |
| 0.15 | 0.00 | 0.91 | 0.7 | 5.69 | 23.4 | 41.43 | 96.4 |
| 0.17 | 0.00 | 1.06 | 1.0 | 6.63 | 28.1 | 48.27 | 98.4 |
| 0.20 | 0.00 | 1.24 | 1.5 | 7.72 | 33.3 | 56.23 | 99.5 |
| 0.23 | 0.00 | 1.44 | 2.2 | 9.00 | 38.9 | 65.51 | 100.0 |
| 0.27 | 0.00 | 1.68 | 3.1 | 10.48 | 44.8 | 76.32 | |
| 0.31 | 0.00 | 1.95 | 4.2 | 12.21 | 51.1 | 88.91 | |
| | | | | 14.22 | 57.6 | >88.91 | |

The calculated $R^2$ values obtained above are below arranged in descending order.

| | Particle type | | $R^2$ |
|---|---|---|---|
| FIG. 2 | Control 1 | carbonyl iron | 0.86 |
| FIG. 8 | Control 7 | 50:50 mix (U.S. 6,027,664) | 0.82 |
| FIG. 9 | Example 1 | Hybrid Atomized single process | 0.77 |
| FIG. 4 | Control 3 | Prior art Atomized single process | 0.70 |
| FIG. 7 | Control 6 | Prior art Atomized single process | 0.66 |
| FIG. 3 | Control 2 | Prior art Atomized single process | 0.65 |
| FIG. 6 | Control 5 | Prior art Atomized single process | 0.63 |
| FIG. 5 | Control 4 | Prior art Atomized single process | 0.63 |

In accordance with controllable devices that contain within the working gap a dry powder or MR fluid, a single process yield atomized particle population exhibiting a $R^2$ of 0.77 and above improved cost-performance is achieved. The single process atomized particles are also characterized by the particles diameter size within the $10^{th}$, $50^{th}$ and $90^{th}$ cumulative volume percentiles ($D_{10}$, $D_{50}$, and $D_{90}$, respectively). Magnetically responsive particles of the MR fluids of the present invention exhibit a $D_{10}$ of from 2 $\mu$m up to and including a $D_{10}$ of 5 $\mu$m; a $D_{50}$, of from 8 $\mu$m to and including a $D_{50}$ of 15 $\mu$m; and a $D_{90}$ of from 25 $\mu$m up to and including a $D_{90}$ of 40 $\mu$m. More preferred single process atomized particles are characterized by a $D_{10}$ of 2 $\mu$m up to and including a $D_{10}$ of 5 $\mu$m; a $D_{50}$ of 10 $\mu$m to and including a $D_{50}$ of 13 $\mu$m; and a $D_{90}$ of 28 $\mu$m up to and including a $D_{90}$ of 35 $\mu$m.

The particle population utilized herein utilizes a process yield from a single process stream, as distinguished from blends of more than one lot, or a blend of particles from different process streams. The improvement is provided wherein the single process population exhibits an $R^2$ of 0.77 and above, a $D_{10}$ from 2 up to and including a $D_{10}$ of 5 $\mu$m, a $D_{50}$ from 8 $\mu$m up to and including a $D_{50}$ of 15 $\mu$m, and a $D_{90}$ of 25 $\mu$m up to and including a $D_{90}$ of 40 $\mu$m. A method to make the particles of a single atomization process yield having the above attributes is disclosed in WO 99/11407. The WO 99/11407 process is a hybrid gas-water atomization process whereby gas (e.g. air) flows into an entry of a tapered inlet nozzle as a laminar flow and flows out of the nozzle at near to speed of sound in the vicinity of the exit of the nozzle. The nozzle assembly contains orifice in a center thereof, a slit surrounding a lower side of the nozzle for injection of water in a shape of an inverse cone, and an ejector tube which is perpendicular to the lower face of the nozzle and coaxial to the orifice. The shape of the nozzle is constructed so that gas is drawn in laminar flow from an upper side of the orifice, the velocity of the gas increases as it passes the narrowing area of the orifice to a speed near or equal to the velocity of sound as gas exits the orifice. The nozzle apparatus contains a baffle plate/annular ring at the exit of the orifice having an aperture with a smaller diameter than an aperture of the exit of the orifice.

The pressure of the gas is decreased from the entry to the exit along the nozzle, is raised upon departure from the exit of the nozzle, and the raised pressure of the gas is decreased until reaching to a point of convergence of a liquid jet of the inverse cone shape flow. The gas emerging from the orifice expands abruptly and collides against a wall of liquid jet, and generates expansion and compression waves by reflections of the collided gas. By repeated reflections on the wall of liquid, expansion and compression waves induce splitting action to the flow of molten metal as the atomizing phenomenon takes place. A commercial product providing the single process yield and above-specified $D_{10}$, $D_{50}$, and $D_{90}$ is sold by Atmix Corp, under the PF-20 E designation. U.S. Pat. No. 6,254,661 is hereby incorporated by reference as if fully described herein.

The atomized magnetically soft particle compositions prepared in the above hybrid method are composed of elements such as iron alone or iron in combination with alloying levels of aluminum, silicon, cobalt, nickel, vanadium, molybdenum, chromium, silicone, tungsten, boron, manganese and/or copper and the like, e.g., iron:cobalt and iron:nickel alloys ranging from about 30:70 W/W to 95:5 W/W, and preferably from about 50:50 to 85:15. Exemplary iron-nickel alloys have a typical iron-nickel weight ratio ranging from about 90:10 to 99:1, and preferably from about 94:6 to 97:3. Alloys may advantageously contain small amounts up to 3 wt. % of other elements, such as vanadium, chromium, etc., in order to improve the ductility and mechanical properties of the alloys. Exemplary particles also comprise iron oxide, and/or iron nitride, and/or iron carbide. Iron oxide includes all known pure iron oxides, such as $Fe_2O_3$ and $Fe_3O_4$, as well as those containing small amounts of other elements, such as manganese, zinc or barium. Specific examples of iron oxide include ferrites and magnetites. Preferably, the magnetic-responsive particles used will have less than about 0.01% carbon. In an especially preferred embodiment, the magnetic-responsive particles will contain 97% to 99% iron, and less than about 1% oxygen and nitrogen.

In the devices employing an MR fluid, the particle component represents from about 5 to about 50 volume percent, and preferably from about 15 to 40 vol. % of the total volume of magnetorheological fluid. The volume % of particle component is selected within the specified range depending on the desired magnetic yield stress desired, the viscosity of the MR fluid and other design criteria desired. The density of the magnetically responsive particles will typically range from about 6.4 $\mu m/cm^3$ to about 7.8 $gm/cm^3$. In terms of weight % corresponding to the above volume fraction of particles, there is 30 to 89 wt. %, preferably about 59 to 85 wt. % particles when the carrier fluid and particles of the magnetorheological fluid have a specific gravity of about 0.80 and 7.8, respectively.

The magnetorheological fluid embodiments contained in the controllable devices of the invention are dispersed in a carrier fluid to provide a magnetorheological fluid composition. The carrier component is typically present in an amount of about 50 to about 95 volume percent of said magnetorheological fluid. The volume % of particle component in magnetorheological fluid embodiments is any range preselected depending upon the designed yield stress level, off-state viscosity, and other fluid or device design factors readily understood by the ordinary skilled person and beyond the scope of this disclosure. The carrier component forms the continuous phase of the magnetorheological fluid. The carrier fluid used to form a magnetorheological fluid from the magnetorheological compositions of the invention may be any of the vehicles or carrier fluids known for use with magnetorheological fluids. If the magnetorheological fluid is designed as an aqueous MR fluid, one of skill in the art will understand which of the additives disclosed herein are suitable for such aqueous systems in accordance with the teachings in the published art. Aqueous carrier systems are described, for example, in U.S. Pat. No. 5,670,077, incorporated herein by reference in its entirety. Where a water-based system is employed, the magnetorheological fluid formed may optionally contain one or more of an appropriate thixotropic agent, an anti-freeze component or a rust-inhibiting agent as representative conventional optional additives.

In preferred aspect devices disclosed herein employing MR fluids utilize a carrier fluid is an organic liquid. Suitable carrier fluids which may be used include natural fatty oils, mineral oils, polyphenylethers, dibasic acid esters, $C_3$–$C_8$ aliphatic alcohol, -glycols, -diols, and -higher polyols, neopentylpolyol esters, phosphate esters, synthetic cycloparaffins and synthetic poly α-olefins, unsaturated hydrocarbon oils, monobasic acid esters, glycol esters and ethers, silicate esters, silicone oils, silicone copolymers, synthetic hydrocarbons, perfluorinated polyethers and esters and halogenated hydrocarbons, and mixtures or blends thereof. Water, and water mixed with miscible organic compounds are useful carrier fluids. A preferred aqueous carrier comprises a mixture of water and one of a $C_3$–$C_8$ diol like ethylene glycol, propylene glycol and butane diol.

Hydrocarbons, such as mineral oils, paraffins, cycloparaffins (also known as naphthenic oils) and synthetic hydrocarbons are the preferred classes of organic carrier fluids. The synthetic hydrocarbon oils include those oils derived from oligomerization of olefins such as polybutenes and oils derived from α-olefins having from 8 to 20 carbon atoms by acid catalyzed dimerization and by oligomerization using trialuminum alkyls as catalysts. Poly-α-olefin oils are particularly preferred carrier fluids. Carrier fluids mentioned herein are prepared by methods well known in the art and such fluids are commercially available. Preferred poly-α-olefin include such products as Durasyn® PAO and Chevron Synfluid® PAO. Preferred poly-α-olefin carrier fluids exhibit a viscosity of from 1 to 50 centistokes at 100° C., and more preferably have a viscosity of from 1 to 10 centistokes at 100° C.

The magnetorheological fluid may optionally include other components such as a thixotropic agent or viscosity modifier, dispersant or surfactant, antioxidant, corrosion inhibitor, and one or more lubricants. Such optional components are known to those skilled in the art. For example, dispersants include carboxylate soaps such as lithium stearate, lithium hydroxy stearate, calcium stearate, aluminum stearate, ferrous oleate, ferrous naphthenate, zinc stearate, aluminum tristearate and distearate, sodium stearate, strontium stearate and mixtures thereof.

Examples of optional additives that provide antioxidant function include zinc dithiophosphates, hindered phenols, aromatic amines, and sulfurized phenols. Examples of lubricants include organic fatty acids and amides, lard oil, and high molecular weight organophosphorus compounds, phosphoric acid esters. Example synthetic viscosity modifiers include polymers and copolymers of olefins, methacrylates, dienes or alkylated styrenes. In addition, other optional additives providing a steric stabilizing function, include fluoroaliphatic polymeric esters, and compounds providing chemical coupling which include organotitanates, -aluminates, -silicone, and -zirconates as coupling agents.

One of skill in the art can readily select optional additive components as desired in a particular formulation. If present, the amount of these optional components typically each can range from about 0.1 to about 12 volume percent, based on the total volume of the magnetorheological fluid. Preferably, optional ingredients utilized will each be present in the range of about 0.5 to about 7.5 volume percent based on the total volume of the magnetorheological fluid.

An optional, but preferred use of a thixotropic agent includes any such agent which provides thixotropic rheology. The thixotropic agent is selected in light of the selected carrier fluid. If the magnetorheological fluid is formed with a carrier fluid which is an organic fluid, a thixotropic agent compatible with such a system may be selected. Thixotropic agents useful for such organic fluid systems are described in U.S. Pat. No. 5,645,752, incorporated herein by reference in its entirety. Preferably, oil-soluble, metal carboxylates, and the like collectively referred to as soaps, such as the carboxylate soaps listed above are used. The thixotropic agents if utilized, are typically employed in an amount ranging from about 0.1 to 5.0 and preferably from about 0.5 to 3.0 percent by volume of the magnetorheological fluid. Examples of preferred thixotropic agents include soaps, colloidal silica, and organoclay. Preferred embodiments contain an organoclay thixotropic agent such as bentonites. Bentonite clays tend to be thixotropic and shear thinning, i.e., they form networks which are easily destroyed by the application of shear, and which reform when the shear is removed. Bentonite clay material is organo-modified by treating with a hydrophobic organic material. The materials referred to as bentonite are sometimes mentioned interchangeably with the term smectite and montmorillonite. Montmorillonite clay typically constitutes a large portion of bentonite clays. Montmorillonite clay contains a large fraction of aluminum silicate. Hectorite clay contains a large fraction of magnesium silicate. Commercially available organomodified clays include, for example, Claytone AF from Southern Clay Products and the Bentone®, Baragel®, and Nykon® families of organoclays from RHEOX. Other suitable clays include those disclosed in U.S. Pat. No. 5,634,969 to Cody et al. A preferred organoclay is Claytone EM.

The off-state viscosity of the magnetorheological fluid containing the magnetorheological compositions of the present invention is dependent upon the volume of particle component and type of carrier fluid, largely. One of skill in the art will determine the desired necessary viscosity according to the identified application for the magnetorheological fluid.

The magnetorheological fluid of the invention may also contain other optional additives such as dyes or pigments, abrasive particles, lubricants, antioxidants, pH shifters, salts, deacidifiers and/or corrosion inhibitors. These optional additives may be in the form of dispersions, suspensions, or materials that are soluble in the carrier vehicle.

The organoclays are used in concentrations of between about 0.1 to 12% by wt., preferably from 0.3 to 5.0 wt. %, based on the weight of the MR fluid composition. In a preferred embodiment the sole thixotropic agent present is bentonite, excluding other types of thickeners.

Preferred embodiments contain compounds that reduce interparticle friction (friction reducing additive), such as but not limited to, colloidal sized silica particles, molybdenum compounds such as organomolybdenums, molybdenum sulfide or -disulfide, and molybdenum phosphate; and fluorocarbon polymers such as polytetrafluoroethylene, and mixtures thereof. In preferred embodiments, there is also included with a friction-reducing additive an extreme pressure additive. Extreme pressure additives are known in the art of lubricants and include organophosphorus compounds, phosphonate compounds, phosphonite, phosphate, phosphinate, phosphinite, phosphite and known derivates like their amide or imide derivatives, thiophosphorus compounds and thiocarbamates. Exemplary useful organophosphorus extreme pressure additives for inclusion with the magnetically-responsive particles herein have a structure represented by the formula:

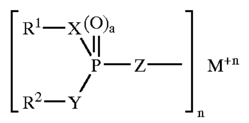

wherein $R^1$ and $R^2$ are each independently hydrogen, an amino group, or an alkyl group having 1 to 22 carbon atoms; X, Y and Z are each independently —$CH_2$—, a nitrogen heteroatom or an oxygen heteroatom, provided that at least one of X, Y or Z is an oxygen heteroatom; a is 0 or 1; and n is the valence of M; provided that if X, Y and Z are each an oxygen heteroatom, M is a metal ion or salt moiety formed from an amine of the formula B:

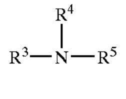

wherein $R^3$, $R^4$ and $R^5$ are each independently hydrogen or aliphatic groups having 1 to 18 carbon atoms; if at least one of X, Y or Z is not an oxygen heteroatom, M is selected from the group consisting of a metallic ion, a non-metallic moiety and a divalent moiety; with a further proviso that if Z is —$CH_2$—, then M is a divalent moiety, and if Z is a nitrogen heteroatom, M is not an amine of formula B.

Representative thiophosphorus extreme pressure additives have a structure represented by formula A:

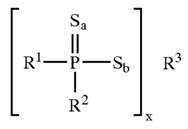

wherein $R^1$ and $R^2$ each individually have a structure represented by:

$$Y—((C)(R^4)(R^5))_n—(O)_w—$$

wherein Y is hydrogen or a functional group—containing moiety such as an amino, amido, imido, carboxyl, hydroxyl, carbonyl, oxo or aryl; n is an integer from 2 to 17 such that $C(R^4)(R^5)$ is a divalent group having a structure such as a straight-chained aliphatic, branched aliphatic, heterocyclic, or aromatic ring; $R^4$ and $R^5$ can each individually be hydrogen, alkyl or alkoxy; and w is 0 or 1.

A preferred number of thiocarbamate extreme pressure additives have a structure represented by formula B:

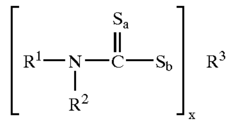

wherein $R^1$ and $R^2$ each individually have a structure represented by:

$$Y—((C)(R^4)(R^5))_n—$$

wherein Y is hydrogen or a functional group—containing moiety such as an amino, amido, imido, carboxyl, hydroxyl, carbonyl, oxo or aryl; n is an integer from 2 to 17 such that $C(R_4)(R_5)$ is a divalent group having a structure such as a straight-chained aliphatic, branched aliphatic, heterocyclic, or aromatic ring; and $R^4$ and $R^5$ can each individually be hydrogen, alkyl or alkoxy. $R^3$ of formula A or B is a metal ion such as molybdenum, tin, antimony, lead, bismuth, nickel, iron, zinc, silver, cadmium or lead, and the like, or a nonmetallic moiety such as hydrogen, a sulfur-containing group, alkyl, alkylaryl, arylalkyl, hydroxyalkyl, an oxy-containing group, amido or an amine. Subscripts a and b of formula A or B are each individually 0 or 1, provided a+b is at least equal to 1 and x of formula A or B is an integer from 1 to 5 depending upon the valence number of $R^3$.

Known organomolybdenum compounds are described in U.S. Pat. No. 4,889,647 and U.S. Pat. No. 5,412,130, both incorporated herein by reference. A suitable organomolybdenum complex is prepared by reacting a fatty oil, diethanolamine and a molybdenum source. A suitable heterocyclic organomolybdate is prepared by reacting dial, diamino-thiol-alcohol and amino- alcohol compounds with a molybdenum source in the presence of a phase transfer agent. Other suitable organomolybdenums are described in U.S. Pat. No. 5,137,647 incorporated herein by reference, such as organomolybdenum compounds prepared by reacting an amine-amide with a molybdenum source. Molybdenum thiadiazoles are preferred molybdenum compounds and are described in U.S. Pat. No. 5,627,146 hereby incorporated by reference. Commercially available molybdenum thiadiazoles are available from R.T. Vanderbilt Company under the Molyvan® 822 and Molyvan® 2000 designation. Another example is a molybdenum hexacarbonyl dixanthogen. An organomolybdenum prepared by reacting a hydrocarbyl substituted hydroxy alkylated amine with a molybdenum source as disclosed in incorporated herein by reference; and alkyl esters of molybdic acid as disclosed in U.S. Pat. No. 2,805,997 incorporated herein by reference. Preferred organomolybdenum compounds are prepared according to U.S. Pat. No. 4,889,647 and U.S. Pat, No. 5,412,130 incorporated herein by reference, and one in particular is commercially available from R.T. Vanderbilt Inc. under the designation Molyvan® 855.

When employing an organomolybdenum compound, these are available in a liquid state at ambient temperature, and can be introduced to an MR fluid in effective usage levels ranging from 0.1 to 12 vol. %, preferably 0.25 to 10 vol. %, based on the total volume of the magnetorheological fluid.

The magnetorheological fluid embodiments used in the devices in accordance with the present invention can be prepared by initially mixing the ingredients together by hand under relatively low shear with a spatula or the like and then subsequently more thoroughly mixing under relatively higher shear with a homogenizer, mechanical mixer or shaker, or dispersing the ingredients with an appropriate milling device such as a ball mill, sand mill, attritor mill, paint mill, colloid mill, or the like which are well known.

The testing of various application specific devices, such as dampers, mounts, brakes, and clutches, that utilize magnetorheological fluids of the present invention is a second method of evaluating the mechanical performance of these materials. The controllable fluid-containing device is simply placed in line with a mechanical actuator and operated with a specified displacement and amplitude and frequency. A magnetic field is appropriately applied to the device and the force output determined from the resulting extension/compression waveforms plotted as a function of time. The methodology utilized to test dampers, mounts, and clutches is well known to those skills in the art of vibration control.

The particle component used in accordance with the embodiments of the invention exhibit a relatively slow dry powder flow rate as compared to magnetically responsive particles of the prior art. The method for determining the relative powder flow rates of various particle types using a scintillation vial is described below.

Example magnetically responsive particles are described below for comparison purposes. In each example, the percentages given for each particle group where particle mixtures are shown is expressed in weight percent based on the total weight of the mixture of different populations of particles.

Powder Flow Test 35 grams of metal powder are placed into a 20 ml scintillation vial. The vial is tapped several times to level and settle the powder. The vial is threaded to a tapered funnel having a 15 mm opening and 60° taper angle, which is attached to a 6V vibrating motor adapted from a telephone paging device. The time recorded to empty the contents is recorded. Two to three repeats are made with fresh samples and an average is taken. Measurements of various grades of iron particles were made to compare the powder flow rates.

| | $D_{10}$ | $D_{50}$ | $D_{90}$ | $R^2$ | Type | Particles | Time to empty (Sec.) | Ave. Sec. |
|---|---|---|---|---|---|---|---|---|
| Ctrl. 1 | 1.95 | 4.66 | 10.3 | 0.86 | Carbonyl iron | R-2430[1] | 11, 11, 10 | 10.7 |
| Ctrl. 2 | 11.3 | 29.6 | 66.5 | 0.65 | Water Atom. | FPI (−325 mesh)[2] $D_{50}$ 30 □m | 8, 7.5, 6.5, 7 | 7 |
| Ctrl. 3 | 7.58 | 16.3 | 28.8 | 0.70 | Water Atom. | FPI Grade II (2)[2] | 8, 8, 7.5 | 8 |
| Ctrl. 4 | 10.2 | 19.0 | 32.5 | 0.49 | Water Atom. | FPI Grade II GAF | 4.5, 4.5, 5.5 | 4.8 |
| Ctrl. 5 | 8.88 | 18.9 | 37.3 | 0.63 | Water Atom. | Atomet ® PD3871[3] | 6.5, 7.5, 7.5 | 7 |
| Ctrl. 6 | 8.46 | 18.6 | 37.8 | 0.66 | Water Atom. | Atomet ® PD4155[3] | 11.5, 10.5, 10 | 10.7 |
| | | | | | | Mixtures Weight Ratio | | |
| | | | | | Water Atom. Carbonyl iron | FPI Grade 1 mix with Carbonyl R-2430 | | |
| Ctrl. 7 | 2.63 | 10.5 | 30.8 | 0.82 | " | 50:50 wt. ratio mix | 10, 9, 11 | 10 |
| Ex. 1 | 3.14 | 11.89 | 31.34 | 0.77 | hybrid Atom. | Atmix ® PF20E | 13, 11, 15, 13 | 13 |

[1]Ex. ISP Corporation;

[2]Ex. Hoeganes;

[3]Ex. Quebec Metal Powders

The particles used in accordance with the invention (Ex. 1) are slower in dry powder flow characteristics and surprisingly this correlates with improved magnetorheological response from particle flow through orifices in a controllable device.

Example MR Fluid

A magnetorheological fluid is prepared by mixing 20% Atmix® PF20 E atomized iron powder ($D_{10}$=3.14 μm; $D_{50}$=11.89; $D_{90}$=31.34 μm) ($R^2$=0.77), and containing 99% iron, less than 1% oxygen, less than 1% nitrogen and 0.01% carbon, with 1% by wt. lithium hydroxy stearate, 1% by wt. molybdenum disulfide and the remaining volume 78% to 100% made up of a synthetic hydrocarbon oil carrier fluid derived from poly-α-olefins and sold under the name Durasyn® 162.

What is claimed is:

1. A controllable magnetorheological damping device comprising a stationary housing, a movable piston and a field generator, and characterized by a design (working) gap of from 0.08 mm to 0.90 mm, said device containing magnetic-responsive particles from a single atomization process population stream dispersed in a carrier fluid (MR fluid), said particles are characterized by 10% volume ($D_{10}$) of particles of 2 μm up to and including a $D_{10}$ of 5 μm; a 50% volume of particles ($D_{50}$) of 8 μm up to and including a $D_{50}$ of 15 μm; and 90% volume of particles ($D_{90}$) of 25 μm, up to and including a $D_{90}$ of 40 μm; and wherein said single process population exhibits a least squares regression from log normal distribution ($R^2$) of 0.77 and higher.

2. The magnetorheological damping device of claim 1 wherein said magnetic-responsive particles are mixed with at least one additive that reduces interparticle friction between the magnetic-responsive particles.

3. The magnetorheological damping device of claim 2 wherein the additive is an inorganic molybdenum compound, a fluorocarbon polymer, or mixtures thereof.

4. The magnetorheological damping device of claim 2 wherein the additive is present in an amount of 0.1 to 12 weight percent of the magnetic-responsive particles.

5. The magnetorheological damping device of claim 1 wherein said MR fluid further comprises a dispersant.

6. The magnetorheological damping device of claim 5 wherein the magnetic-responsive particles are iron particles containing less than 1% carbon.

7. The magnetorheological damping device of claim 2 wherein the additive is a molybdenum disulfide or a molybdenum phosphate.

8. The magnetorheological damping device of claim 2 wherein the additive is molybdenum disulfide.

9. The magnetorheological damping device of claim 2 wherein the additive is a fluorocarbon polymer.

10. The magnetorheological damping device of claim 2 wherein the additive is polytetrafluoroethylene.

11. The magnetorheological damping device of claim 1 wherein said particles are dispersed in a carrier fluid selected from the group consisting of water, glycol, natural fatty oil, mineral oil, polyphenylether, dibasic acid ester, neopentylpolyol ester, phosphate ester, polyester, cycloparaffin oil, paraffin oil, unsaturated hydrocarbon oil, silicone oil, naphthenic oil, monobasic acid ester, glycol ester, glycol ether, poly-α-olefin, perfluorinated polyether and halogenated hydrocarbon.

12. The magnetorheological damping device of claim 11 wherein the carrier fluid is mineral oil, paraffin oil, cycloparaffin oil, naphthenic oil or poly-α-olefin.

13. The magnetorheological damping device of claim 12 further comprising a molybdenum compound selected from organomolybdenum compound, molybdenum sulfide, molybdenum disulfide, and molybdenum phosphate.

14. The magnetorheological damping device of claim 13 wherein the molybdenum compound is molybdenum disulfide.

15. The magnetorheological damping device of claim 11, further comprising at least one additive selected from the group consisting of a thixotropic agent, a lubricant, an extreme pressure additive and an antioxidant.

16. The magnetorheological damping device of claim 1 which is a linear damper.

17. The magnetorheological damping device of claim 1 wherein said carrier fluid has a viscosity between about 1 and about 500 centistokes at 100° C.

18. The magnetorheological damping device of claim 17 wherein said carrier fluid has a viscosity of less than about 10 centistokes at 100° C.

19. The magnetorheological damping device of claim 1 wherein said carrier fluid is present in an amount of about 50 to about 95 volume percent of said MR fluid and said magnetically responsive particles are present in an amount of about 5 to about 50 volume percent of said magnetorheological fluid.

20. The magnetorheological damping device of claim 2 wherein said carrier fluid is selected from the group consisting of water, glycol, natural fatty oil, mineral oil, polyphenylether, dibasic acid ester, neopentylpolyol ester, phosphite ester, synthetic cycloparaffin, synthetic paraffin, unsaturated hydrocarbon oil, monobasic acid ester, glycol ester, glycol ether, fluorinated ester and ether, silicate ester, silicone oil, silicone copolymer, poly-α-olefin, perfluorinated polyether and ester, halogenated hydrocarbon and mixtures and derivatives thereof.

21. The magnetorheological damping device of claim 1 wherein said carrier fluid is selected from the group consisting of water, glycol, glycol ester and mixtures thereof.

22. The magnetorheological damping device of claim 5 further comprises a thixotropic agent selected from the group consisting of soap, colloidal silica, and organoclay.

23. The magnetorheological damping device of claim 22 wherein said thixotropic agent is an organoclay selected from organic modified bentonite.

24. The magnetorheological damping device of claim 1 further comprising an extreme pressure additive selected from the group consisting of organophosphorus compound, thiophosphorus compound, thiocarbamate compound.

25. The magnetorheological damping device of claim 24 wherein said extreme pressure additive is a thiocarbamate compound having the following structure:

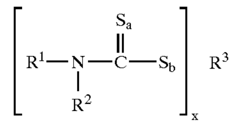

wherein $R^1$ and $R^2$ each individually have a structure represented by:

$$Y—((C)(R^4)(R^5))_n—$$

wherein Y is selected from hydrogen, amino, amido, imido, carboxyl, hydroxyl, carbonyl, oxo or aryl group; n is an integer from 2 to 17; $R^4$ and $R^5$ can each individually be hydrogen, alkyl or alkoxy; and $R^3$ is selected from the group consisting of a metal ion, a nonmetallic moiety, and a divalent moiety; a and b are each individually 0 or 1, provided a+b is at least equal to 1, and x is an integer from 1 to 5 depending upon the valence number of $R^3$.

26. The magnetorheological damping device of claim 24 wherein said extreme pressure additive is an organophosphorus compound having the following structure:

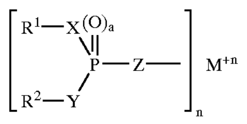

wherein $R^1$ and $R^2$ are each independently hydrogen, an amino group, or an alkyl group having 1 to 22 carbon atoms; X, Y and Z are each independently —$CH_2$—, a nitrogen heteroatom or an oxygen heteroatom, provided that at least one of X, Y or Z is an oxygen heteroatom; a is 0 or 1; and n is the valence of M; provided that if X, Y and Z are each an oxygen heteroatom, M is a salt moiety formed from an amine having the following structure:

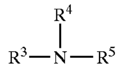

wherein $R^3$, $R^4$ and $R^5$ are each independently hydrogen or aliphatic groups having 1 to 18 carbon atoms; and, if at least one of X, Y or Z is not an oxygen heteroatom, M is selected from the group consisting of a metallic ion, a non-metallic moiety and a divalent moiety and with a further proviso that if Z is a nitrogen heteroatom, then M is not an amine.

27. The magnetorheological damping device of claim 24 wherein said extreme pressure additive is a thiophosphorus compound having the following structure

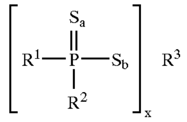

wherein $R^1$ and $R^2$ each individually have a structure represented by:

$$Y—((C)(R^4)(R^5))_n—(O)_W—$$

wherein Y is hydrogen or a functional group—containing moiety such as an amino, amido, imido, carboxyl, hydroxyl, carbonyl, oxo or aryl;

n is an integer from 2 to 17 such that $C(R^4)(R^5)$ is a divalent group having a structure such as a straight-chained aliphatic, branched aliphatic, heterocyclic, or aromatic ring;

$R^4$ and $R^5$ can each individually be hydrogen, alkyl or alkoxy; and w is 0 or 1.

28. The magnetorheological damping device of claim 1 wherein said magnetically responsive particles are composed of materials selected from the group consisting of iron, iron manganese, iron boron, iron oxide, iron nitride, iron carbide, iron chromium, low carbon steel, iron silicon, iron nickel, iron cobalt, and a mixture thereof.

29. The magnetorheological damping device of claim 28 wherein said magnetically responsive particles are composed of materials selected from the group consisting of iron, iron oxide, iron nickel, iron cobalt, iron manganese, iron silicon, and iron boron.

30. The magnetorheological damping device of claim 5 wherein the dispersant is selected from an oleate, naphthenate, sulfonate, phosphate ester, stearic acid, stearate, glycerol monooleate, sorbitan sesquioleate, laurate, fatty acid and fatty alcohol.

31. The magnetorheological damping device of claim 30 wherein the dispersant comprises a stearate.

32. The magnetorheological damping device of claim 1 wherein said MR fluid further comprises a molybdenum compound.

33. The magnetorheological damping device of claim 32 wherein said molybdenum compound is an organomolybdenum.

34. The magnetorheological damping device of claim 32 wherein said molybdenum compound is selected from molybdenum thiadiazole; an organomolybdenum made by reacting a fatty oil, diethanolamine and a molybdenum source; and an organomolybdenum made by reacting a diol, diamino-thiol-alcohol and amino-alcohol with a molybdenum source.

35. The magnetorheological damping device of claim 32 wherein the molybdenum compound is molybdenum disulfide.

36. The magnetorheological damping device of claim 20, wherein the carrier fluid is a poly α-olefin.

37. The magnetorheological damping device of claim 1 containing an MR fluid that comprises 50 to 95% volume of a fluid carrier and 5 to 50% volume of a magnetic-responsive particle component characterized by $D_{10}$ of 2 μm up to and including a $D_{10}$ of 5 μm, a $D_{50}$ of 10 μm up to and including a $D_{50}$ of 13 μm; a $D_{90}$ of 28 μm to and including a $D_{90}$ of 35 μm.

38. The magnetorheological damping device of claim 1 further comprising at least one additive that reduces inter-particle friction between the magnetic-responsive particles, a dispersant, and an extreme pressure additive selected from the group consisting of organophosphorus, thiophosphorus compounds and thiocarbamates.

* * * * *